(12) United States Patent
Kortum et al.

(10) Patent No.: US 7,366,337 B2
(45) Date of Patent: Apr. 29, 2008

(54) PERSONAL BILL DENOMINATION READER

(75) Inventors: Philip Ted Kortum, Austin, TX (US); Aaron Bangor, Austin, TX (US); Marc Andrew Sullivan, Austin, TX (US); Jeffrey Lewis Brandt, Cedar Park, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 722 days.

(21) Appl. No.: 10/776,930

(22) Filed: Feb. 11, 2004

(65) Prior Publication Data

US 2005/0175230 A1    Aug. 11, 2005

(51) Int. Cl.
*G06K 9/00* (2006.01)

(52) U.S. Cl. .................................... 382/135

(58) Field of Classification Search ............... 382/135, 382/114, 218, 313, 116, 232; 235/380; 455/567
See application file for complete search history.

(56) References Cited

U.S. PATENT DOCUMENTS

| 4,442,541 | A | * | 4/1984 | Finkel et al. ............... 382/135 |
|---|---|---|---|---|
| 4,464,786 | A | * | 8/1984 | Nishito et al. ............... 382/135 |
| 4,611,345 | A | * | 9/1986 | Ohnishi et al. ............. 382/135 |
| 4,817,185 | A | * | 3/1989 | Yamaguchi et al. ........ 382/313 |
| 4,823,393 | A | * | 4/1989 | Kawakami ................... 382/135 |
| 4,984,280 | A | * | 1/1991 | Abe ............................ 382/135 |
| 5,636,565 | A |   | 6/1997 | Lawrance et al. |
| 5,692,068 | A | * | 11/1997 | Bryenton et al. ........... 382/135 |
| 6,094,587 | A | * | 7/2000 | Armanto et al. ............ 455/567 |
| 6,427,020 | B1 |  | 7/2002 | Rhoads |
| 6,464,135 | B1 |  | 10/2002 | Cohen et al. |
| 6,522,771 | B2 |  | 2/2003 | Rhoads |
| 6,523,006 | B1 |  | 2/2003 | Ellis et al. |
| 6,527,171 | B1 |  | 3/2003 | Brooks et al. |
| 6,535,791 | B1 |  | 3/2003 | Wang |
| 7,024,016 | B2 | * | 4/2006 | Rhoads et al. .............. 382/100 |
| 2005/0103838 | A1 | * | 5/2005 | Slotkin et al. .............. 235/380 |

* cited by examiner

*Primary Examiner*—Matthew C. Bella
*Assistant Examiner*—Claire X. Wang
(74) *Attorney, Agent, or Firm*—Toler Law Group

(57) ABSTRACT

A memory stores built-in images per bill denomination for a plurality of bill denominations. The built-in images may include a corresponding image for each of four corners for each of two sides of the bill denomination. A camera captures an image of a bill. A pattern recognizer matches the image of the bill to one of the built-in images in the memory. An output device reports the denomination of the bill based on the match from the pattern recognizer.

21 Claims, 3 Drawing Sheets

PERSONAL BILL DENOMINATION READER

FIELD OF THE DISCLOSURE

The present disclosure relates to methods and systems for reading a denomination of currency.

DESCRIPTION OF THE RELATED ART

People with low or no vision typically develop sophisticated methods to identify the denomination of currency in their possession. These methods typically involve folding and segmentation of bills in a unique manner for each denomination of currency. For example, $20 bills may be folded in a first unique way, and $10 bills may be folded in a second unique way. However, when receiving a bill such as when receiving change, the aforementioned people must trust that the individual giving them the bills are correctly identifying them.

There is an existing device that reads bill denominations that uses standard bill reading technology, much like that found in a vending machine, and provides an audio output. The size of the device is significantly larger than the bill in order to scan the entire bill to read its denomination.

BRIEF DESCRIPTION OF THE DRAWING

The present invention is pointed out with particularity in the appended claims. However, other features are described in the following detailed description in conjunction with the accompanying drawings in which:

DETAILED DESCRIPTION OF THE DRAWINGS

There is a need for a personal bill denomination reader that is readily available for a user, and allows him/her to use the reader in a discrete and secure way while providing the freedom to use paper money during everyday activities.

To address this need and other needs, embodiments of a personal bill denomination reader with tactile output are disclosed herein. A specific tactile output pattern is generated for each recognized denomination of currency. The tactile output provides a high measure of security and privacy while the user "counts" his/her money, functions well in a noisy environment such as a restaurant, and is suitable for users who suffer a hearing impairment. The personal bill denomination reader can be integrated with a mobile telephone or a key fob to facilitate portability with the user.

Figure 1:
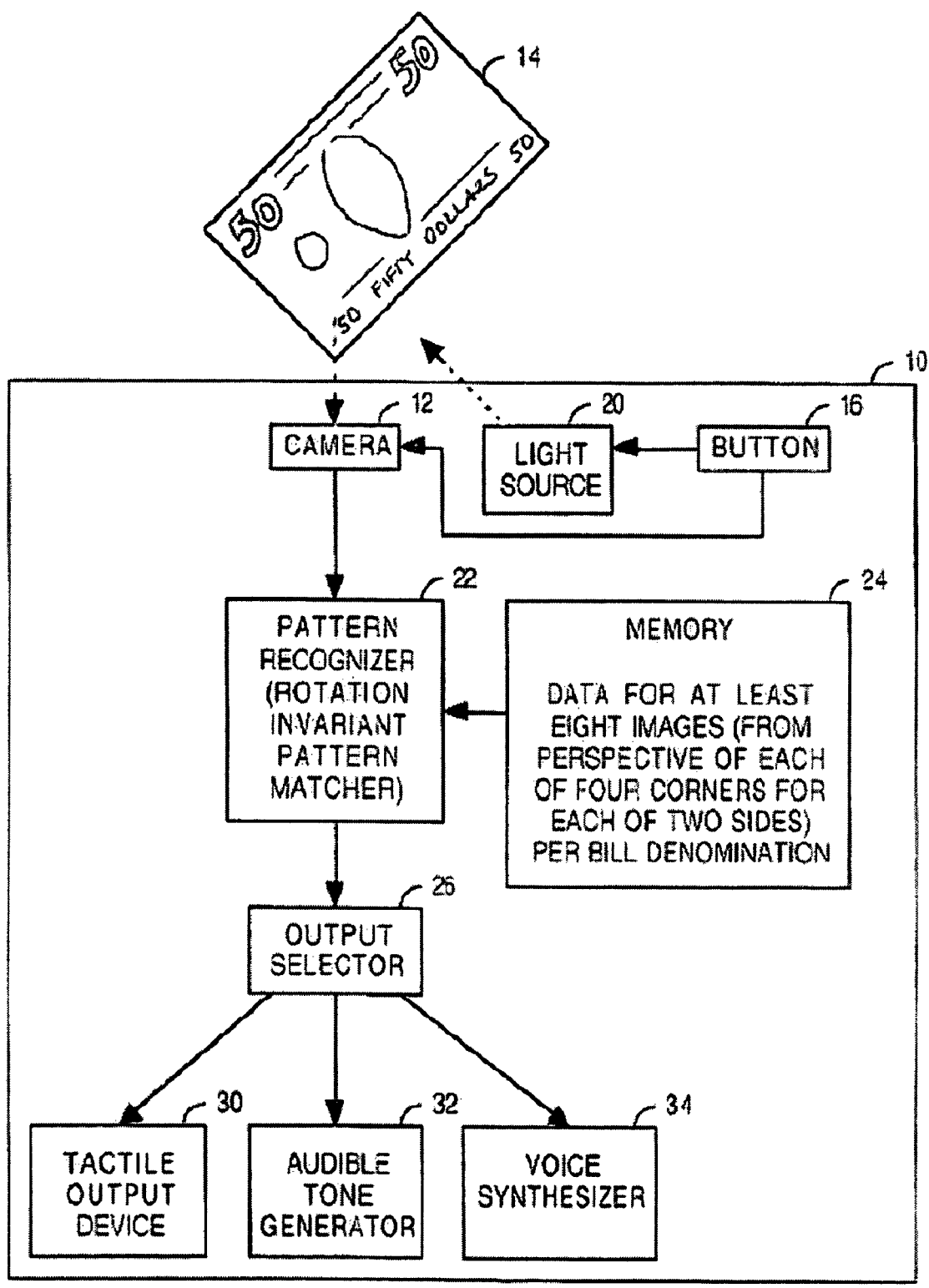
FIG. 1 is a block diagram of an embodiment of the personal bill denomination reader.

FIG. 1 is a block diagram of an embodiment of the personal bill denomination reader 10. The personal bill denomination reader 10 comprises a digital camera 12 to capture an image of a bill 14. The digital camera 12 can capture and store the image in response to a user-initiated depression of a button 16 or another user-initiated action. Optionally, the reader 10 includes a light source 20 to illuminate the bill 14 to support capturing images in dimly-lit places. The light source 20 may be activated in response to the user-initiated depression of the button 16 or another user-initiated action.

The image of the bill 14 is taken from the perspective of one of the corners of the bill 14. In practice, the user may identify a corner of the bill 14 by touch, then hold the reader 10 so that the digital camera 12 is proximate the corner, and press the button 16 to capture an image from the perspective of the corner and activate a bill identification feature.

The captured image is processed by a pattern recognizer 22. The pattern recognizer 22 compares the captured image to built-in images 24 of all standard bill denominations to match the captured image to one of the built-in images 24. In the United States, the standard bill denominations may comprise $1, $2, $5, $10, $20, $50 and $100 bills, for example. Local bill denominations for other countries may be used in international embodiments.

Since each bill has four corners and two sides, the built-in images 24 comprise at least eight built-in images per bill denomination, the built-in images comprising a corresponding image of each of four corners for each of two sides of the bill denomination. The built-in images 24 may also comprise built-in images for previous versions of the currency. For example, since modifications were made to the $20 bill in the year 2003, the built-in images 24 may comprise at least eight images of pre-2003 $20 bills, and at least eight more images of $20 bills issued in 2003.

It is noted that the built-in images 24 may be represented within the personal bill denomination reader 10 either by actual images of bills or a transformation of the actual images of bills.

The pattern recognizer 22 uses a rotation-invariant pattern matching algorithm so that the bill 14 can be recognized for various orientations of the bill 14 with respect to the reader 10. Built into the algorithm is pattern matching for markings on the front and back of all standard bill denominations, which include current and previous versions of the currency. Since the number of templates is reasonably low, the pattern recognizer 22 can identify the bill 14 nearly instantaneously.

Once a positive identification of the bill 14 has been made by the pattern recognizer 22, the reader 10 reports the denomination of the bill 14 in a mode determined by an output selector 26. The mode is selected from a tactile output mode, an audible tone mode and a speech mode. Preferably, the user can select the specific mode via a user input received by the reader 10.

In the tactile output mode, a tactile output device 30 generates a tactile output unique to the denomination of the bill 14 based on the match from the pattern recognizer 22. The tactile output mode provides a high level of security in that other people near the user are not made aware of the denomination of the bill 14.

In one embodiment, the tactile output device 30 is capable of vibrating in a unique pattern of time and/or frequency for each denomination. Thus, the tactile output device 30 vibrates in a pattern unique to the denomination of the bill 14 based on the match from the pattern recognizer 22. The user feels the vibration pattern and determines the denomination of the bill 14 based thereon.

In another embodiment, the tactile output device 30 comprises a small dynamic Braille display to generate a Braille representation of the denomination of the bill 14 based on the match from the pattern recognizer 22. The user touches the Braille display with his/her hand to sense the Braille representation, and interprets the Braille representation to determine the denomination of the bill 14.

In a further embodiment, the tactile output device 30 comprises a pressure display capable of generating a unique pressure signal for each denomination of the bill 14 based on the match from the pattern recognizer 22. For example, the pressure display may comprise a plastic pin or another component that rises and lowers in a unique pattern for each denomination. In one embodiment, the plastic pin or other component rises and lowers a humanly-countable number of times based on the denomination. For example, the plastic pin or other component may rise once for $1, twice slowly for $2, and twice quickly for $20.

In the audible tone mode, an audible tone generator 32 generates a series of one or more distinctive, non-speech tones associated with the detected denomination of the bill 14. The user hears the audible tones and determines the denomination of the bill 14 thereon. The audible tone mode provides a degree of security in that other people near the user would not know the denomination of the bill 14 unless they knew how to translate the distinctive tones. The audible tone mode also facilitates use of the reader 10 by users who have limited tactile function.

In the speech mode, a voice synthesizer 34 generates a voice signal to speak the denomination of the bill 14. The voice synthesizer 34 may generate the voice signal either by playing back a pre-recorded voice recording or by synthesizing speech. Use of a voice recording allows natural intonated output but requires memory space. Use of synthesized speech is more unnatural, but facilitates programmability and flexibility (e.g. if the voice synthesizer 34 is to be capable of speaking the denomination in multiple languages). While not as secure as the tactile and tone modes, the speech mode requires no learning on the part of the user since the exact denomination rather than a code is given to the user.

The reader 10 may assume a variety of handheld forms. In one embodiment, the reader 10 is integrated with a mobile telephone. In another embodiment, the reader 10 has the form of a key fob. These and alternative embodiments are beneficial in that the reader 10 can fit in a pocket for carrying by the user.

Figure 2:
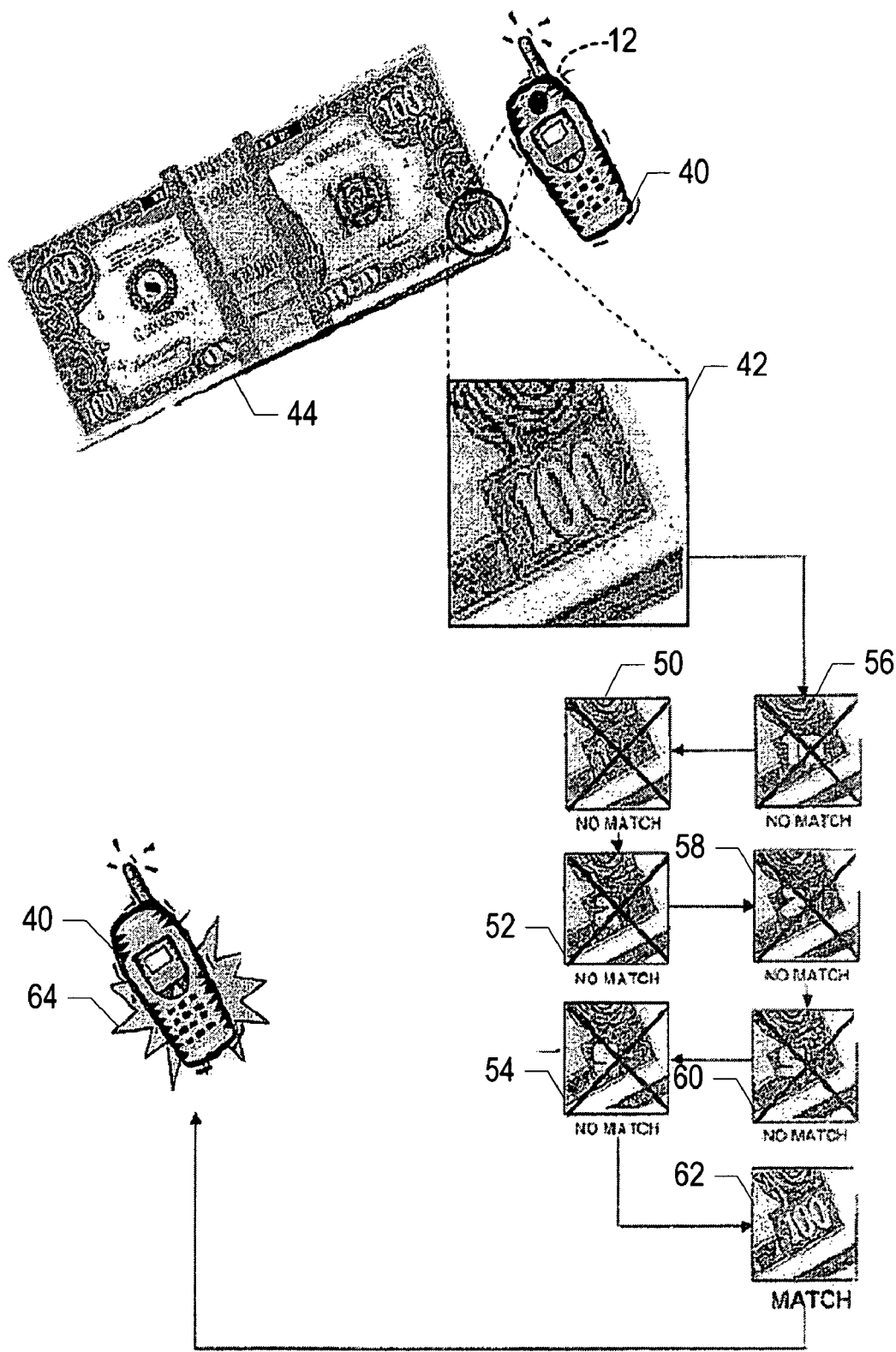
FIG. 2 shows an embodiment of the personal bill denomination reader integrated with a mobile telephone and its operation.

FIG. 2 shows an embodiment of the reader 10 integrated with a mobile telephone 40, and its operation. The digital camera 12 may be provided by the mobile telephone's camera used for wireless picture messaging applications. The tactile output device 30 may be provided by a vibration alerting device of the mobile telephone 40 that serves to alert of incoming telephone calls and incoming messages. The audible tone generator 32 may be provided by the mobile telephone's audible ringer that serves to alert of incoming telephone calls and incoming messages. The voice synthesizer 34 may comprise either pre-recorded speech or synthesized speech of "one dollar", "two dollars", "five dollars", "ten dollars", "twenty dollars", "fifty dollars" and "one hundred dollars" to output on a speaker of the mobile telephone 40. Thus, in this embodiment, an individual with low/no vision is enabled to determine the denomination of a bill using his/her wireless camera phone 40.

FIG. 2 shows an image 42 of a corner of a bill 44 being acquired using the wireless camera phone 40. The image 42 is processed through pattern recognition to determine a pattern match based on built-in images 50, 52, 54, 56, 58, 60 and 62 of $1, $2, $5, $10, $20, $50 and $100 bills, respectively. In the example of FIG. 2, the image 42 is matched to the built-in image 62 of the $100 bill. The wireless camera phone 40 reports the bill denomination by an output 64 comprising either a vibration pattern specific to a $100 bill, a tone pattern specific to a $100 bill, or synthesized speech indicating a $100 bill.

Figure 3:
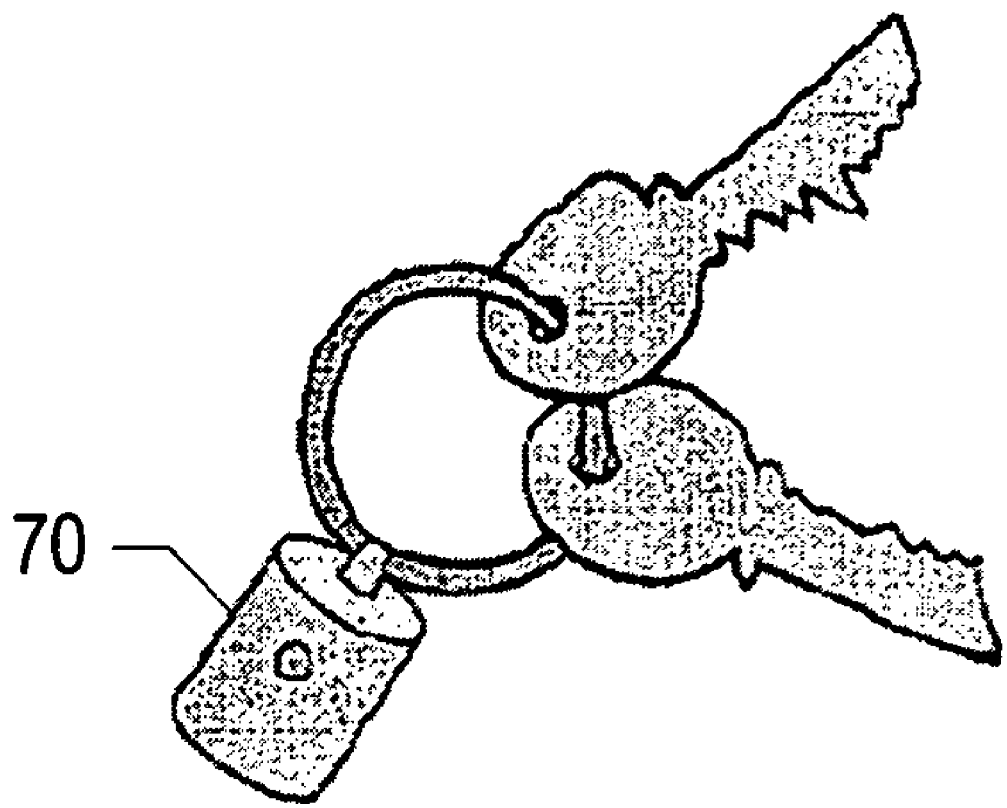
FIG. 3 shows an embodiment of the personal bill denomination reader having the form of a key fob.

FIG. 3 shows an embodiment of the reader 10 having the form of a key fob 70. In one embodiment, the key fob 70 houses the components of the reader 10 shown in FIG. 1, namely the camera 12, the button 16, the optional light source 20, the pattern recognizer 22, the memory 24, the output selector 26, and at least one of the tactile output device 30, the audible tone generator 32 and the voice synthesizer 34. The key fob 70 has superior portability and cost effectiveness. A user can hold the key fob 70 to a corner of the bill 14, press the button 16, and receive denomination information through one of the three modes described above.

It will be apparent to those skilled in the art that the disclosed emdodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A personal bill denomination reader comprising:
    a memory to store at least eight built-in images per bill denomination for a plurality of bill denominations, the at least eight built-in images comprising a corresponding image for each of four corners for each of two sides of the bill denomination;
    a camera to capture an image of a bill;
    a pattern recognizer to match the image of the bill to one of the built-in images in the memory, wherein the the pattern recognizer is to use a rotation-invariant pattern matching algorithm to match the image of the bill to one of the built-in images; and
    at least one output device to report the denomination of the bill based on the match from the pattern recognizer.

2. The personal bill denomination reader of claim 1 further comprising an output selector to determine a mode to report the denomination of the bill.

3. The personal bill denomination reader of claim 2 wherein the output selector has a tactile output mode, an audible tone mode, and a speech mode.

4. The personal bill denomination reader of claim 1 wherein the at least one output device comprises a tactile output device to vibrate in a pattern unique to the denomination of the bill.

5. The personal bill denomination reader of claim 1 wherein the at least one output device comprises a dynamic Braille display to generate a Braille representation of the denomination of the bill.

6. The personal bill denomination reader of claim 1 wherein the at least one output device comprises a pressure display having a component that rises and lowers in a pattern unique to the denomination of the bill.

7. The personal bill denomination reader of claim 1 further comprising a key fob to house the memory, the camera, the pattern recognizer, and the at least one output device.

8. A personal bill denomination reader comprising:
    a memory to store built-in images for a plurality of bill denominations;
    a camera to capture an image of a bill;
    a pattern recognizer to match the image of the bill to one of the built-in images in the memory, wherein the pattern recognizer is to use a rotation-invariant pattern matching algorithm to match the image of the bill to one of the built-in images; and an output device to generate an output unique to the denomination of the bill based on the match from the pattern recognizer.

9. The personal bill denomination reader of claim 8 wherein the output device is to vibrate in a pattern unique to the denomination of the bill.

10. The personal bill denomination reader of claim 8 wherein the output device comprises a dynamic Braille display to generate a Braille representation of the denomination of the bill.

11. The personal bill denomination reader of claim 8 wherein the output device comprises a pressure display having a component that rises and lowers in a pattern unique to the denomination of the bill.

12. The personal bill denomination reader of claim 8 wherein the memory stores at least eight built-in images per bill denomination for the plurality of bill denominations, the at least eight built-in images comprising a corresponding image for each of four corners for each of two sides of the bill denomination.

13. The personal bill denomination reader of claim 8 further comprising a key fob to house the memory, the camera, the pattern recognizer, and the tactile output device.

14. A mobile telephone comprising:
a memory to store built-in images for a plurality of bill denominations;
a camera to capture an image of a bill, and to capture images in a picture messaging application;
a pattern recognizer to match the image of the bill to one of the built-in images in the memory, wherein the pattern recognizer is to use a rotation-invariant pattern matching algorithm to match the image of the bill to one of the built-in images; and a tactile output device to vibrate in a pattern unique to the denomination of the bill based on the match from the pattern recognizer, the tactile output device further to vibrate to alert of an incoming telephone call.

15. The mobile telephone of claim 14 wherein the memory stores at least eight built-in images per bill denomination for the plurality of bill denominations, the at least eight built-in images comprising a corresponding image for each of four corners for each of two sides of the bill denomination.

16. The mobile telephone of claim 14 further comprising an output selector to determine a mode to report the denomination of the bill.

17. The mobile telephone of claim 16 wherein the output selector has a tactile output mode, an audible tone mode, and a speech mode.

18. The mobile telephone of claim 17 further comprising an audible ringer to alert of an incoming telephone call, the audible ringer to generate one or more distinctive, non-speech tones unique to the denomination of the bill based on the match from the pattern recognizer if the output selector is in the audible tone mode.

19. The personal bill denomination reader of claim 1, wherein the built-in images comprise built-in images for previous versions of bill denominations.

20. The personal bill denomination reader of claim 19, wherein the built-in images for previous versions of bill denominations include at least eight images of a pre-2003 bill of twenty dollar denomination.

21. The personal bill denomination reader of claim 1, wherein the memory is further to store a transformation of an image of a bill.

* * * * *